United States Patent
Chin et al.

(10) Patent No.: US 7,792,075 B2
(45) Date of Patent: Sep. 7, 2010

(54) METHOD AND APPARATUS TO PERFORM PERSISTENCE TESTS IN A NETWORK

(75) Inventors: Tom Chin, San Diego, CA (US); Bao Nguyen, Corona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 716 days.

(21) Appl. No.: 11/327,242

(22) Filed: Jan. 5, 2006

(65) Prior Publication Data
US 2007/0153730 A1 Jul. 5, 2007

(51) Int. Cl.
*G06F 15/16* (2006.01)
(52) U.S. Cl. ........................... 370/329; 370/338
(58) Field of Classification Search .............. 370/338, 370/349, 236, 445, 329; 455/41.2
See application file for complete search history.

(56) References Cited

U.S. PATENT DOCUMENTS

| | | | |
|---|---|---|---|
| 6,754,501 B1 | 6/2004 | McRae et al. | |
| 7,136,991 B2 | 11/2006 | Henry et al. | |
| 2002/0163933 A1* | 11/2002 | Benveniste | 370/465 |
| 2006/0008083 A1* | 1/2006 | Saito | 380/28 |

FOREIGN PATENT DOCUMENTS

WO 93018601 9/1993

OTHER PUBLICATIONS

International Search Report—PCT/US07/060184—International Search Authority—European Patent Office—Dec. 17, 2007.
3GPP2: "Medium Access Control (MAC) Standard for CDMA2000 Spread Spectrum Systems Release D" 3GPPC. S0003-D, Online, (Sep. 2005), pp. 1,2/87-2/109, XP002460407.
Written Opinion-PCT/US07/060184, International Search Authority-European Patent Office-Dec. 17, 2007.

* cited by examiner

*Primary Examiner*—Sam Bhattacharya
(74) *Attorney, Agent, or Firm*—Francois Pelaez

(57) ABSTRACT

A method and apparatus to perform persistence tests for a mobile station in a network are described. The apparatus includes a random number generator, a timer module, and a processor coupled to the random number generator and the timer module. A counter for the random number generator configured to count access slots is initialized. One or more random numbers are successively generated, until a value of a generated random number is lower than a first predetermined value. At the same time, the counter is successively incremented based on the number of generated random numbers. When the counter value is higher than or equal to a second predetermined value of successive iterations, or, in the alternative, when the value of the generated random number is lower than the first predetermined value, the mobile station is deactivated for a predetermined number of access slots equal to the counter value. A timer interrupt further runs subsequent to the expiration of the predetermined number of access slots. Finally, if an access probe needs to be transmitted to the network, the timer interrupt is disabled and a random access number is generated in preparation for transmission of the access probe to enable access to the network.

32 Claims, 8 Drawing Sheets

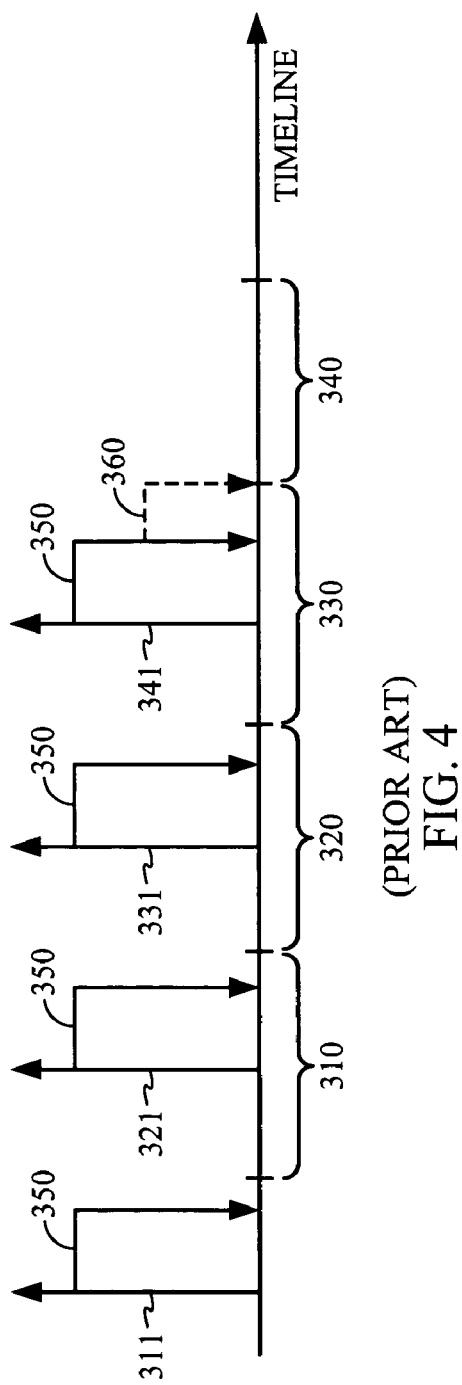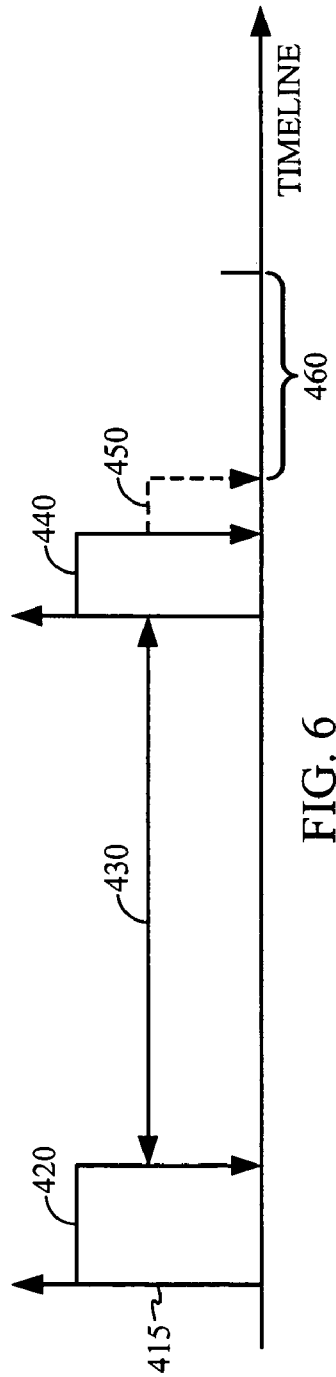

METHOD AND APPARATUS TO PERFORM PERSISTENCE TESTS IN A NETWORK

BACKGROUND

1. Field of the Invention

The present invention relates generally to data communications and, more specifically, to a method and apparatus to perform persistence tests in a network, such as, for example, a wireless communication network.

2. Background

The explosive increase in demand for wireless connectivity has created numerous challenges, one of which revolves around potential interference among multiple users trying to access and share common communication channels. In wireless communication networks, such as, for example, cellular telephone networks, one or more mobile user stations, which may be mobile or stationary, communicate with one or more base stations arranged to provide coverage to the mobile stations. Each mobile station transmits and receives voice or data or both through the base stations. The mobile station needs to establish an active traffic channel connection with one or more base stations during the connection setup phase. Alternatively, the mobile station may attempt to establish such a network access connection during the registration process or during data bursts for short messaging service (SMS).

During the connection setup state, for example, the mobile station performs a network access attempt characterized by one or more access sub-attempts. Each access sub-attempt includes one or more transmissions called access probes. The access probes are grouped into one or more access probe sequences. The timing of the access probes and access probe sequences is expressed in terms of access slots. The transmission of an access probe begins usually at the start of an access slot. For each access slot, the mobile station performs a persistence test, as described in "Medium Access Control (MAC) Standard for cdma2000 Spread Spectrum Systems," Release D, by the Third Generation Partnership Project 2 (3GPP2), 3GPP2 C.S0003-D, version 1.0, of Feb. 13, 2004. If the test is successful, the first access probe of the access probe sequence starts in that particular access slot. Otherwise, if the test is unsuccessful, the access probe sequence is deferred until at least the next access slot and the mobile station has to wait in an idle mode until the next access slot triggers a new persistence test.

However, for shorter access slots, such as, for example, access slots around 1.25 milliseconds, the repeated performance of unsuccessful persistence tests, followed each time by a subsequent idle waiting of the mobile station, burdens the usage of the central processing unit (CPU) of the mobile station and has the potential to block the performance of other CPU tasks. In addition, for longer access slots, such as, for example, access slots in the range of 80 to 520 milliseconds, the repeated performance of unsuccessful persistence tests, followed by the subsequent idle waiting of the mobile station, leads to increased power consumption. Thus, what is needed is a method and apparatus to perform persistence tests that increase the task processing efficiency of the CPU within the mobile station and lead to reduced power consumption.

SUMMARY

A method and apparatus to perform persistence tests for a mobile station in a network are described. The apparatus includes a random number generator, a timer module, and a processor coupled to the random number generator and the timer module. A counter for the random number generator configured to count access slots is initialized. One or more random numbers are successively generated, until a value of a generated random number is lower than a first predetermined value. At the same time, the counter is successively incremented based on the number of generated random numbers. When the counter value is higher than or equal to a second predetermined value of successive iterations, or, in the alternative, when the value of the generated random number is lower than the first predetermined value, the mobile station is deactivated for a predetermined number of access slots equal to the counter value. A timer interrupt further runs subsequent to the expiration of the predetermined number of access slots. Finally, if an access probe needs to be transmitted to the network, the timer interrupt is disabled and a random access number is generated in preparation for transmission of the access probe to enable access to the network.

BRIEF DESCRIPTION OF THE DRAWINGS

FIG. 4 illustrates the prior art method to perform persistence tests within the wireless communication network;

FIG. 6 illustrates the method to perform persistence tests within the wireless communication network, according to one embodiment of the invention;

DETAILED DESCRIPTION

Figure 1:
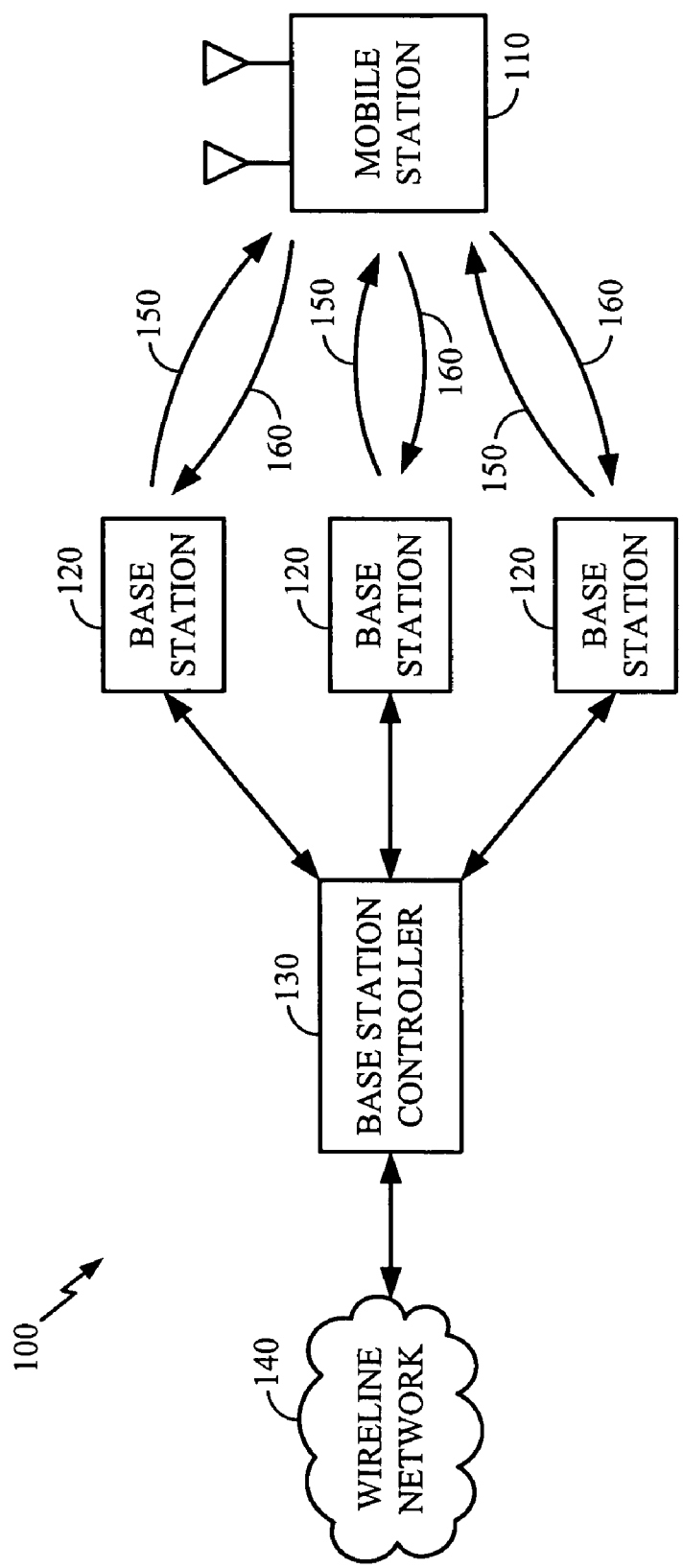
FIG. 1 is a block diagram illustrating an exemplary wireless communications network.

FIG. 1 is a block diagram illustrating an exemplary wireless communications network 100 in which an apparatus to perform persistence tests may be used. A mobile station 110, which may be mobile or stationary, may communicate with one or more base stations 120. A mobile station 110, also referred herein as a "mobile", transmits and receives voice or data or both through one or more base stations 120 connected to a base station controller 130. Base stations 120 and base station controllers 130 are parts of a network called an Access Network. Base station controller 130 connects to a wireline network 140.

An access network transports voice or data to and between base stations 120. The access network may be further connected to additional networks outside the access network, such as a wired telephone system, a corporate intranet, or the Internet, all of which may constitute part of the wireline network 140. The access network may transport voice and data between each access mobile 110 and such outside networks.

A mobile 110 that has established an active traffic channel connection with one or more base stations 120 is called an active mobile station, and is said to be in a traffic state. A mobile 110 that is in the process of establishing an active traffic channel connection with one or more base stations 120 is said to be in a connection setup state. The communication link that the mobile 110 uses to sends signals to the base station 120 is called the reverse link 160. The communication link that a base station 120 uses to send signals to a mobile 110 is called the forward link 150. Alternatively, the mobile 110 may attempt to establish such a network access connection during the registration process or during data bursts for short messaging service (SMS).

During the connection setup state, for example, the mobile 110 performs a network access attempt characterized by one or more access sub-attempts. Each access sub-attempt includes one or more transmissions called access probes. The access probes are grouped into one or more access probe sequences. The timing of the access probes and access probe sequences is expressed in terms of access slots. The transmission of an access probe begins usually at the start of an access slot. For each access slot, the mobile 110 performs a persistence test. If the test is successful, the first access probe of the access probe sequence starts in that particular access slot. Otherwise, if the test is unsuccessful, the access probe sequence is deferred until at least the next access slot.

Figure 2:
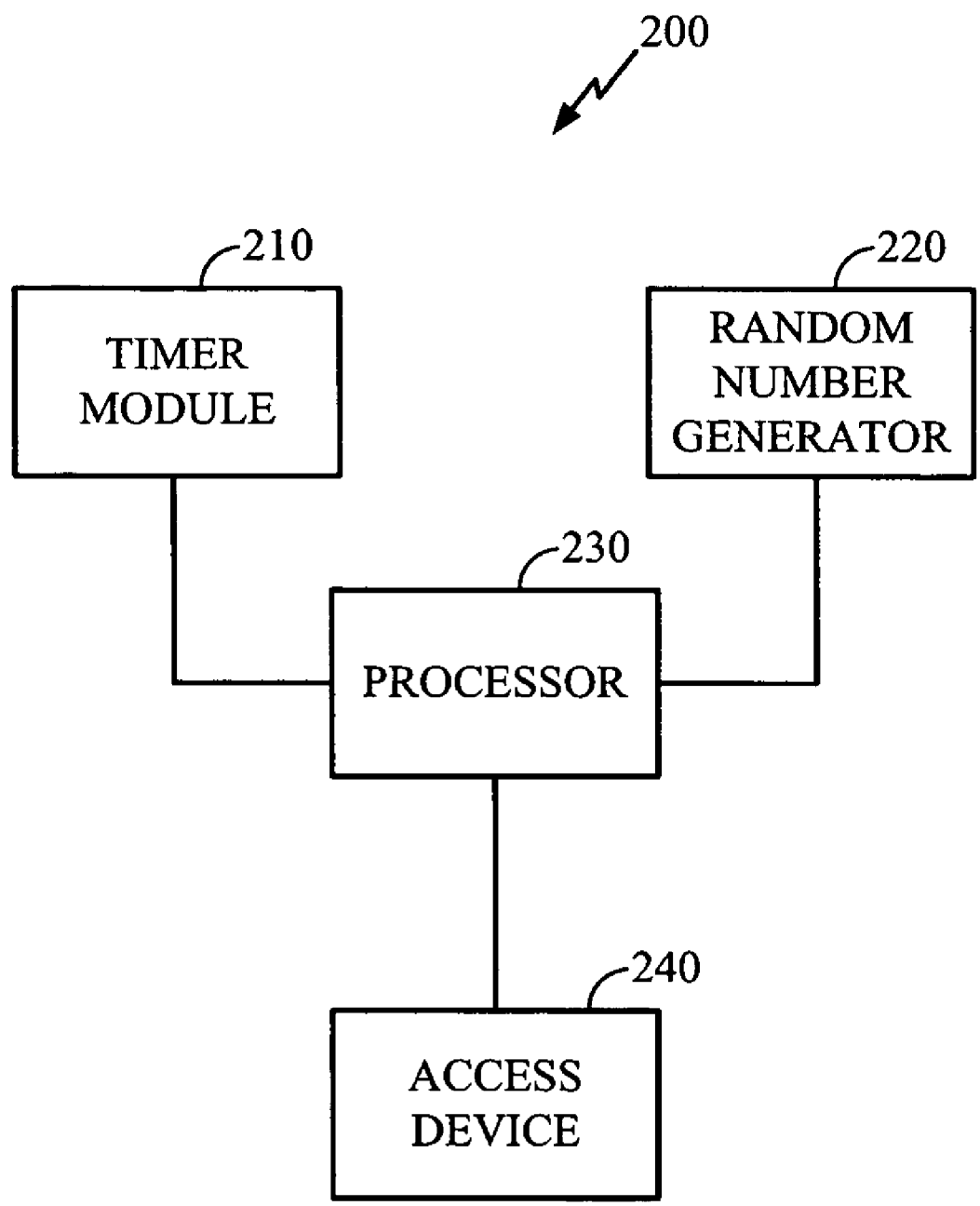
FIG. 2 is a block diagram illustrating an apparatus to perform persistence tests within the wireless communication network, according to one embodiment of the invention.

FIG. 2 is a block diagram illustrating an apparatus to perform persistence tests within the wireless communication network, according to one embodiment of the invention. In one embodiment, the apparatus 200 resides within the mobile station 110 shown in FIG. 1. The systems and apparatuses described herein for performing persistence tests are applicable to any wireless communication system, using various multiple access schemes, such as, but not limited to, Code Division Multiple Access (CDMA), Frequency Division Multiple Access (FDMA), Orthogonal Frequency Division Multiplexing (OFDM) or Time Division Multiple Access (TDMA). Examples of CDMA multiple access schemes include but are not limited to TIA/EIA/IS-95, TIA/EIA/IS-2000 or cdma2000, 1xEV-DO, 1xEV-DV, 802.11a, 802.11b, 802.11g, 802.11n, WIMAX, and WCDMA.

In one embodiment, the apparatus 200 includes a timer module 210 configured to run a timer interrupt at every access slot to enable performance of persistence tests during the access attempt. The apparatus 200 further includes a random number generator 220 and a processor coupled to the timer module 210 and to the random number generator 220. In one embodiment, the processor 230 is a hardware and/or software module configured to instruct the timer module 210 to run the timer interrupt and to instruct the random number generator 220 to generate random numbers at predetermined times during the access procedure, as described in further detail below. In one embodiment, the apparatus 200 further includes an access device 240 configured to enable communication and to interface with the access network.

Figure 3:
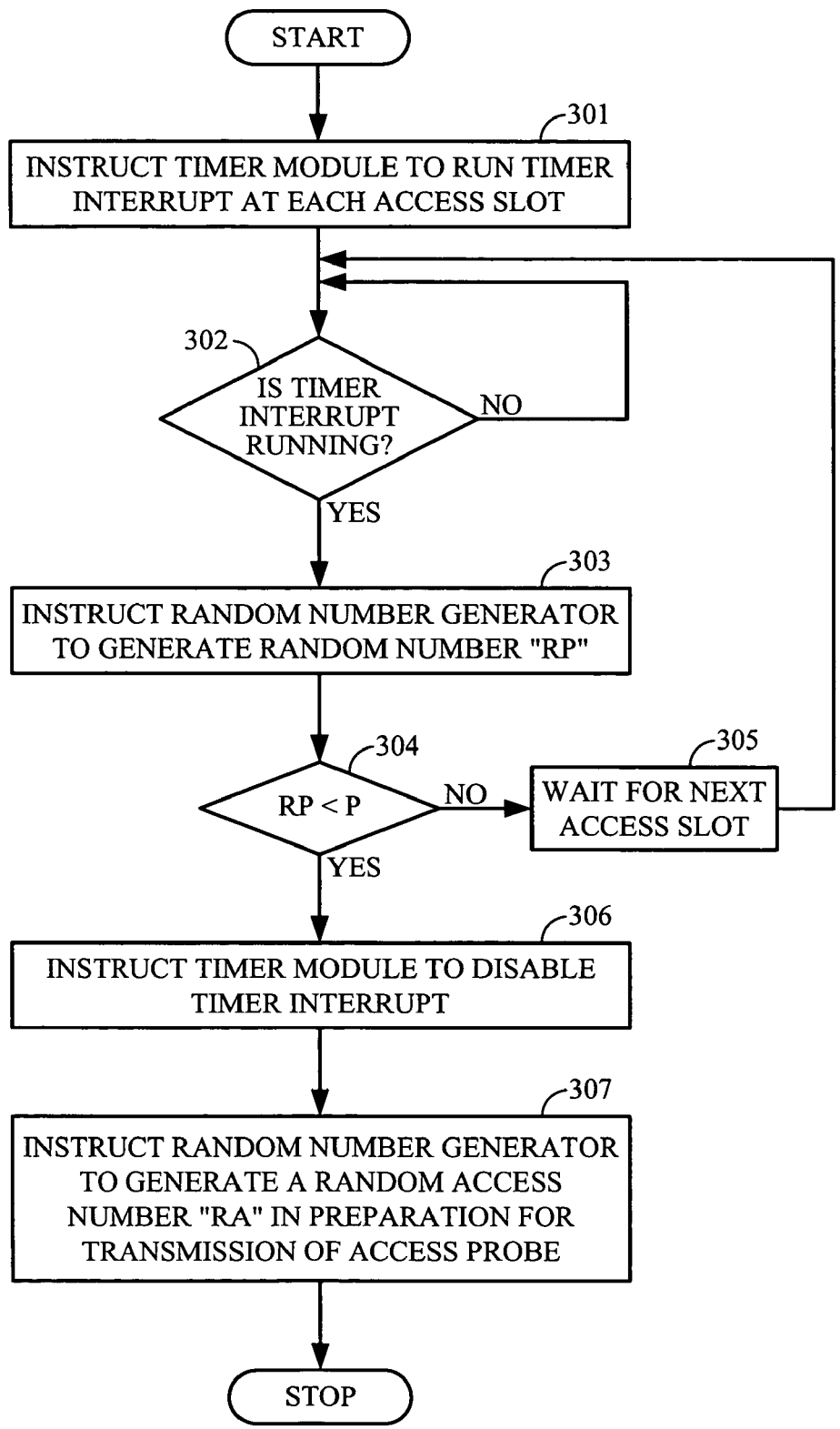
FIG. 3 is a flow diagram illustrating a prior art method to perform persistence tests within the wireless communication network.

FIG. 3 is a flow diagram illustrating a prior art method to perform persistence tests within the wireless communication network. As illustrated in FIG. 3, at processing block 301, the processor 230 instructs the timer module 210 to run a timer interrupt at each access slot.

The processor 230 monitors the running of the timer interrupt for a current access slot and, at processing block 302, a decision is made whether the timer interrupt is running for the selected access slot. If the timer interrupt is not running, processing block 302 is repeated. Otherwise, if the timer interrupt is running, at processing block 303, the processor 230 instructs the random number generator 220 to generate a random number "RP," with 0<RP<1, according to a known technique described in detail in "Upper Layer (Layer 3) Signaling Standard for cdma2000 Spread Spectrum Systems," by the Third Generation Partnership Project 2 (3GPP2), 3GPP2 C.S0005-D, of February 2004.

Subsequent to generation of the random number RP, the processor 230 compares the random number RP to a predetermined value P, selected to indicate whether the persistence test is successful or not, and, at processing block 304, a decision is made whether RP<P, which would indicate a successful persistence test result.

If the value of the random number RP is higher or equal to the predetermined P value, then, at processing block 305, the processor 230 waits for the next access slot and processing blocks 302 through 304 are repeated. Otherwise, if the value of the random number RP is lower than the predetermined P value, then, at processing block 306, the processor 230 instructs the timer module 210 to disable the timer interrupt. Subsequently, at processing block 307, the processor 230 instructs the random number generator 220 to generate a random access number "RA," in preparation for transmission of the access probe.

FIG. 4 illustrates the prior art method to perform persistence tests within the wireless communication network. As illustrated in FIG. 4, the mobile 110 performs three unsuccessful persistence tests prior to respective access slots 310, 320, and 330, and, subsequently, performs a successful persistence test prior to the access slot 340. For each access slot 310, 320, 330, the timer interrupt 350 runs at states 311, 321, and 331 prior to the respective start of the access slots 310, 320, 330, but the persistence test fails and the mobile 110 has to wait until state 341 to test for the next access slot 340. Once a successful persistence test is performed, at state 360, the mobile 110 prepares to transmit the corresponding access probe for further setup of the active access channel.

Figure 5:
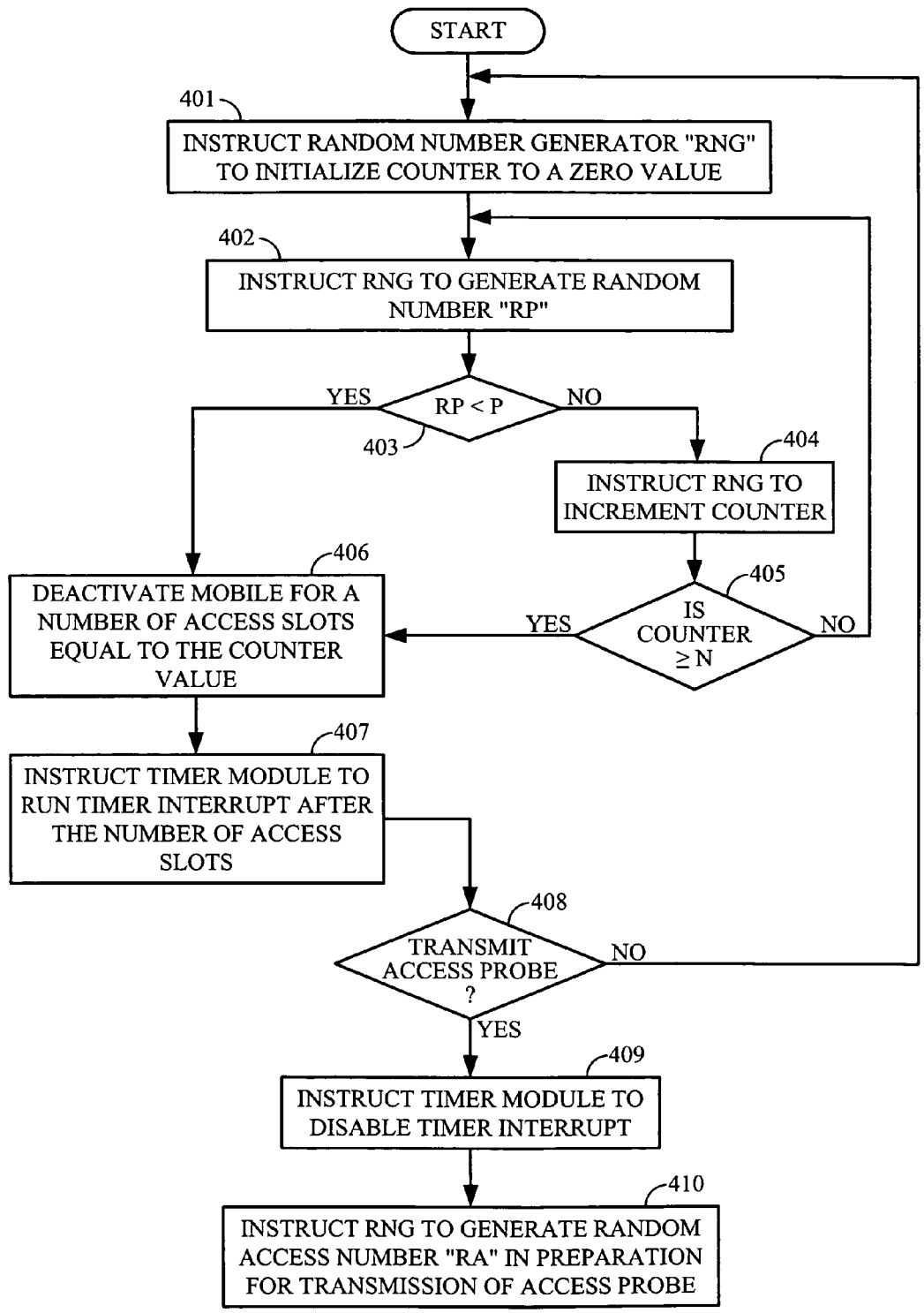
FIG. 5 is a flow diagram illustrating a method to perform persistence tests within the wireless communication network, according to one embodiment of the invention.

FIG. 5 is a flow diagram illustrating a method to perform persistence tests within the wireless communication network, according to one embodiment of the invention. As illustrated in FIG. 5, at processing block 401, the processor 230 instructs the random number generator (RNG) 220 to initialize a counter to a predetermined initial value, such as, for example, a zero value, the counter being provided to count the access slots, as described in further detail below. At processing block 402, the processor 230 instructs the random number generator 220 to generate a random number "RP," the random number having a positive value lower than one, 0<RP<1. Subsequent to generation of the random number RP, the processor 230 compares the random number RP to a first predetermined value P, selected to indicate whether the persistence test is successful or not, and, at processing block 403, a decision is made whether RP<P, which would indicate a successful persistence test result.

If the value of the random number RP is higher than or equal to the predetermined P value, then, at processing block 404, the processor 230 instructs the random number generator 220 to increment the counter by one. In one embodiment, the processor 230 monitors the counter value and, conversely, how many random numbers RP have been generated, in relation to a second predetermined value N of successive iterations, such as, for example, N=20. Thus, at processing block 405, a decision is made whether the counter value is higher than or equal to N. If the counter value is lower than N, processing blocks 402 through 403 are repeated.

Otherwise, if the RNG counter value is higher than or equal to N, at processing block 406, the processor 230 deactivates the mobile 110 for a number of access slots equal to the RNG counter value. Similarly, in one embodiment, if the value of the random number RP is lower than the predetermined P value, signaling a successful persistence test, at processing block 406, the processor 230 deactivates the mobile 110 for a number of access slots equal to the RNG counter value.

At processing block 407, the processor 230 instructs the timer module 210 to activate the mobile 110 and to run a timer interrupt after the predetermined number of access slots. Subsequently, at processing block 408, a decision is made whether to transmit the access probe. If the access probe need not be transmitted, then, processing blocks 401 through 407 are repeated after the subsequent activation of the mobile 110.

In one embodiment, if the access probe needs to be transmitted, at processing block 409, the processor 230 instructs the timer module 210 to disable the timer interrupt. Finally, at processing block 410, the processor 230 instructs the random number generator 220 to generate a random access number "RA," in preparation for transmission of the access probe.

FIG. 6 illustrates the method to perform persistence tests within the wireless communication network, according to one embodiment of the invention. As illustrated in FIG. 6, at the start 415 of the access probe sequence, the random number generator 220 within the mobile 110 generates multiple random numbers RP until RP<P at state 420. Once a successful persistence test is performed, at state 430, the mobile 110 is deactivated for a predetermined number of access slots equal to the RNG counter value. Subsequently, at state 440, the mobile 110 is activated, the timer module 210 runs a timer interrupt and, at state 450, the activated mobile 110 prepares to transmit the corresponding access probe for access slot 460.

Figure 7:
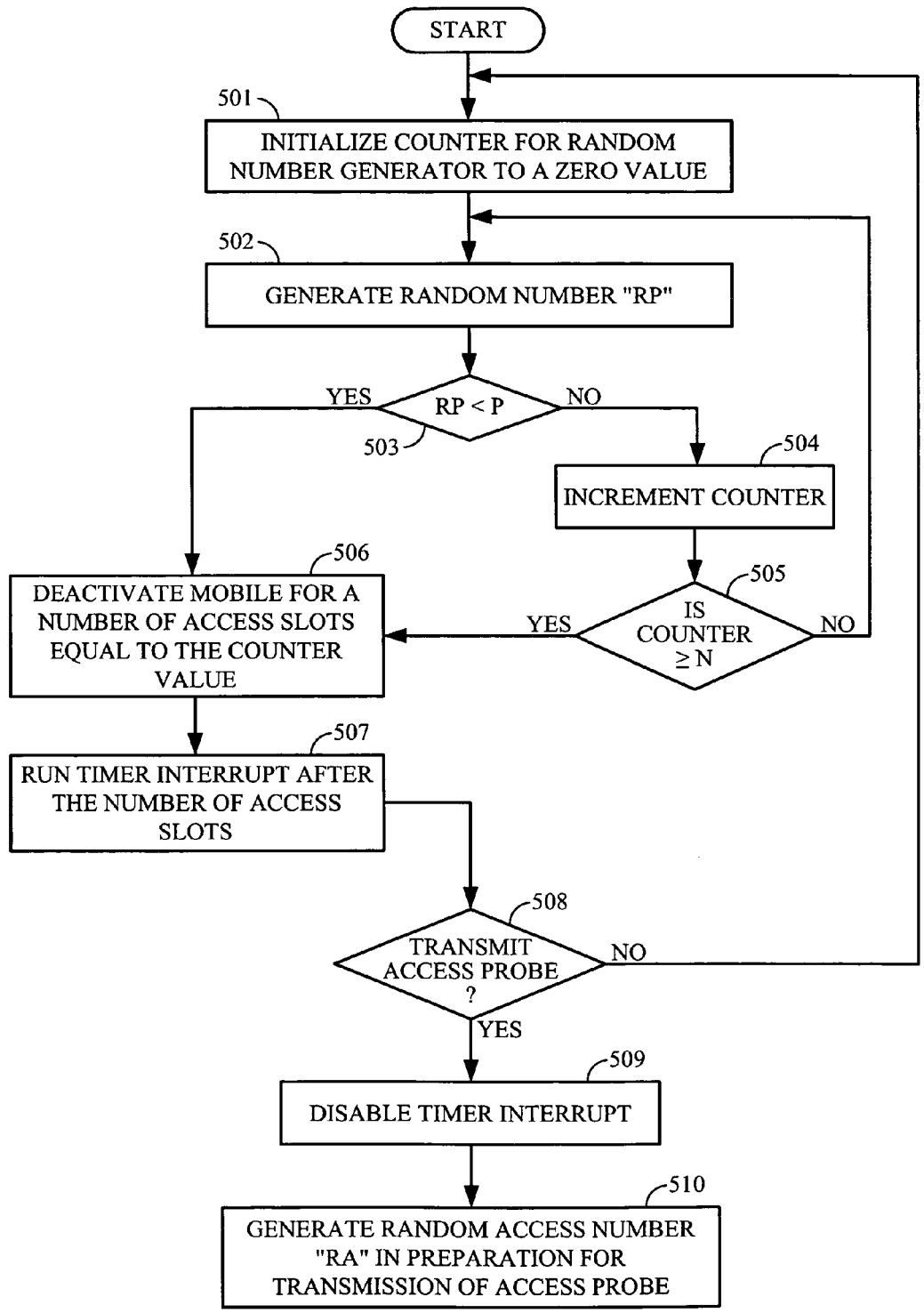
FIG. 7 is a flow diagram illustrating a method to perform persistence tests within the wireless communication network, according to an alternate embodiment of the invention.

FIG. 7 is a flow diagram illustrating a method to perform persistence tests within the wireless communication network, according to an alternate embodiment of the invention. As illustrated in FIG. 7, at processing block 501, a counter, which is provided to count the access slots, is initialized to a zero value. At processing block 502, a random number "RP" is generated, the random number having a positive value lower than one, 0<RP<1. Subsequent to generation of the random number RP, the random number RP is compared to a first predetermined value P, selected to indicate whether the persistence test is successful or not, and, at processing block 503, a decision is made whether RP<P, which would indicate a successful persistence test result.

If the value of the random number RP is higher than or equal to the predetermined P value, then, at processing block 504, the counter value is incremented by one. In one embodiment, the counter value also indicates how many random numbers RP have been generated, in relation to a second predetermined value N of successive iterations, such as, for example, N=20. Thus, at processing block 505, a decision is made whether the counter value of the random number generator 220 is higher than or equal to N. If the counter value is lower than N, processing blocks 502 through 503 are repeated.

Otherwise, if the counter value is higher than or equal to N, at processing block 506, the mobile 110 is deactivated for a number of access slots equal to the counter value. Similarly, in one embodiment, if the value of the random number RP is lower than the predetermined P value, signaling a successful persistence test, also at processing block 506, the mobile 110 is deactivated for a number of access slots equal to the counter value.

At processing block 507, the mobile 110 is activated and a timer interrupt runs after the predetermined number of access slots. Subsequently, at processing block 508, a decision is made whether to transmit the access probe. If the access probe need not be transmitted, then, processing blocks 501 through 507 are repeated after the activation of the mobile 110.

In one embodiment, if the access probe needs to be transmitted, at processing block 509, the timer interrupt is disabled. Finally, at processing block 510, a random access number "RA" is generated in preparation for transmission of the access probe.

Figure 8:
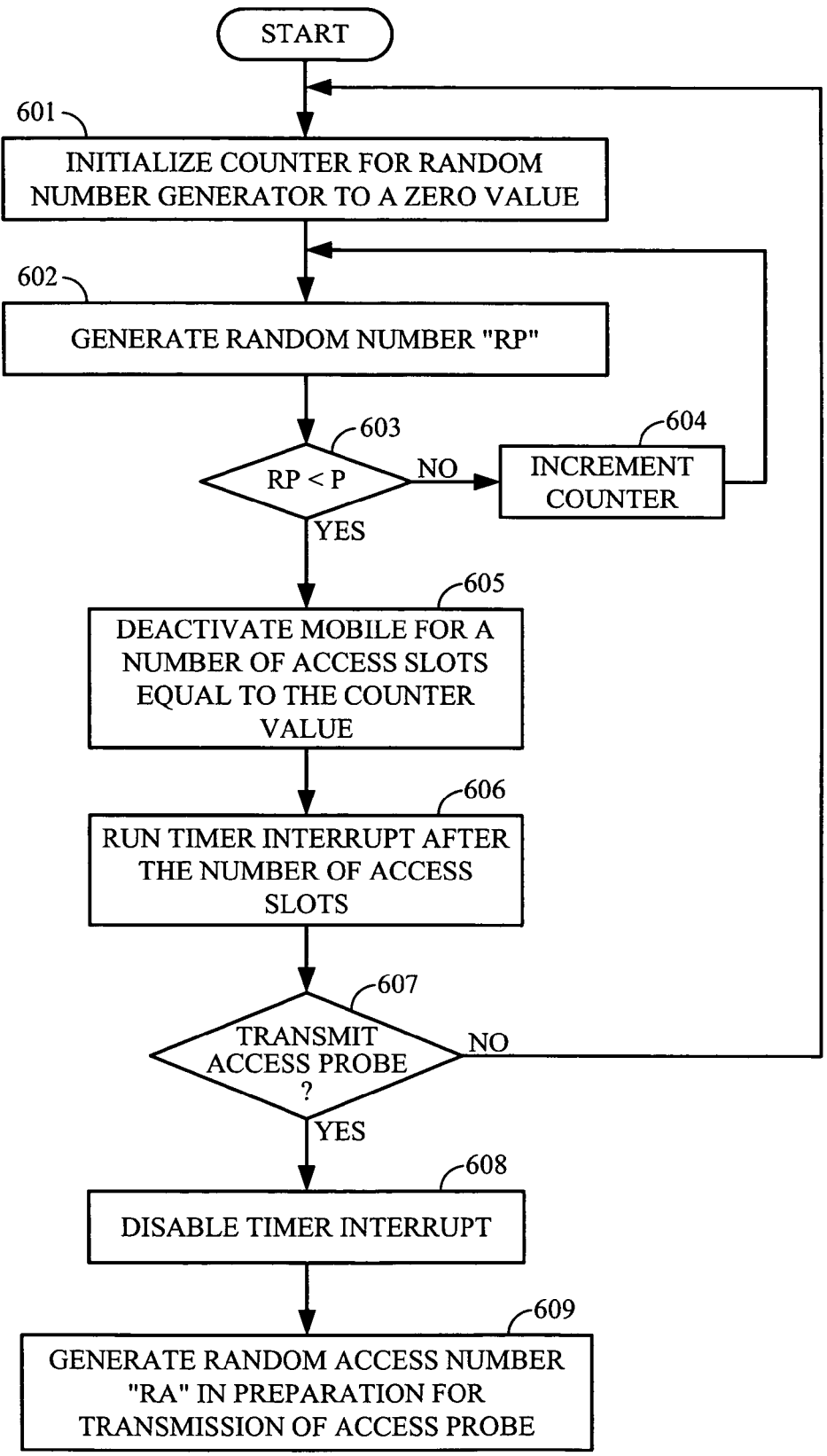
FIG. 8 is a flow diagram illustrating a method to perform persistence tests within the wireless communication network, according to another alternate embodiment of the invention.

FIG. 8 is a flow diagram illustrating a method to perform persistence tests within the wireless communication network, according to another alternate embodiment of the invention. As illustrated in FIG. 8, at processing block 601, a counter, which is provided to count the access slots, is initialized to a zero value. At processing block 602, a random number "RP" is generated, the random number having a positive value lower than one, 0<RP<1. Subsequent to generation of the random number RP, the random number RP is compared to a first predetermined value P, selected to indicate whether the persistence test is successful or not, and, at processing block 603, a decision is made whether RP<P, which would indicate a successful persistence test result.

If the value of the random number RP is higher than or equal to the predetermined P value, then, at processing block 604, the counter is incremented and processing blocks 602 through 603 are repeated. In one embodiment, the counter value also indicates how many random numbers RP have been generated.

If the value of the random number RP is lower than the predetermined P value, signaling a successful persistence test, at processing block 605, the mobile 110 is deactivated for a number of access slots equal to the counter value.

At processing block 606, the mobile 110 is activated and a timer interrupt runs after the predetermined number of access slots. Subsequently, at processing block 607, a decision is made whether to transmit the access probe. If the access probe need not be transmitted, then, processing blocks 601 through 606 are repeated after subsequent activation of the mobile 110.

In one embodiment, if the access probe needs to be transmitted, at processing block 608, the timer interrupt is disabled. Finally, at processing block 609, a random access number "RA" is generated in preparation for transmission of the access probe.

Figure 9:
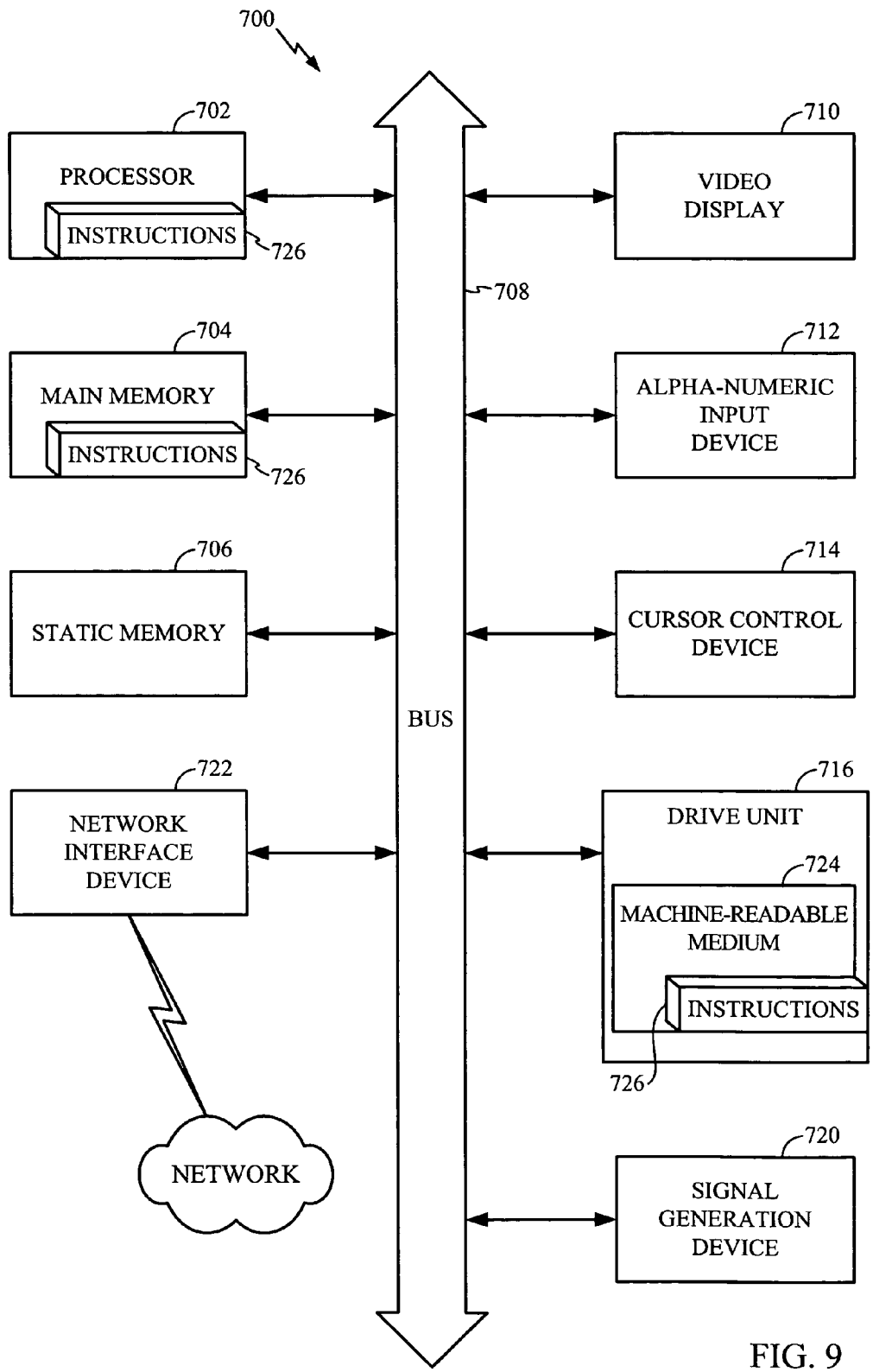
FIG. 9 is a diagrammatic representation of a machine in the exemplary form of a computer system within which a set of instructions may be executed.

FIG. 9 shows a diagrammatic representation of a machine in the exemplary form of a computer system 700 within which a set of instructions, for causing the machine to perform any one of the methodologies discussed above, may be executed. In alternative embodiments, the machine may comprise a network router, a network switch, a Personal Digital Assistant (PDA), a cellular telephone, a web appliance or any machine or computing device capable of executing a sequence of instructions that specify actions to be taken by that machine.

The computer system 700 includes a processor 702, a main memory 704 and a static memory 706, which communicate with each other via a bus 708. The computer system 700 may further include a video display unit 710, e.g. a liquid crystal display (LCD) or a cathode ray tube (CRT). The computer system 700 also includes an alphanumeric input device 712, e.g., a keyboard, a cursor control device 714, e.g. a mouse, a disk drive unit 716, a signal generation device 720, e.g. a speaker, and a network interface device 722.

The disk drive unit 716 includes a machine-readable medium 724 on which is stored a set of instructions, i.e. software, 726 embodying any one, or all, of the methodologies described above. The software 726 is also shown to reside, completely or at least partially, within the main memory 704 and/or within the processor 702. The software 726 may further be transmitted or received via the network interface device 722.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software executed by a processor, or in a combination of the two. It is to be understood that these embodiments may be used as or to support software programs, which are executed upon some form of processor or processing core (such as the CPU of a computer), or otherwise implemented or realized upon or within a machine or computer readable medium. A machine readable medium includes any mechanism for storing or transmitting information in a form readable by a machine (e.g., a computer). For example, a machine readable medium includes RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method to perform a persistence test to enable a device to access a communication network, said method comprising:
    generating successively at least one random number until a value of said at least one random number is lower than a first predetermined value;
    deactivating said device for a predetermined number of access slots equal to a count of successive generations of said at least one random number while said value of said at least one random number is higher than or equal to said first predetermined value; and
    activating a timer interrupt to run subsequent to said predetermined number of access slots in preparation for transmission of an access probe to said communication network to enable said access to said network.

2. The method according to claim 1, wherein said device is a mobile station and said network is a wireless communication network.

3. The method according to claim 1, wherein said predetermined number of access slots is equal to a counter value of a counter provided to count said successive generations.

4. The method according to claim 1, further comprising generating a random access number for transmission of said access probe to said communication network.

5. The method according to claim 3, further comprising:
    initializing said counter to a zero value; and
    incrementing said counter by one subsequent to the generation of each of said at least one random number.

6. The method according to claim 5, further comprising, if said counter value of said counter reaches a second predetermined value, deactivating said device for a number of access slots equal to said second predetermined value.

7. The method according to claim 1, further comprising disabling said timer interrupt prior to transmission of said access probe.

8. The method according to claim 1, wherein each of said at least one generated random number has a positive value lower than one.

9. An apparatus to perform a persistence test to enable a device to access a communication network, said apparatus comprising:
    a random number generator to generate successively at least one random number until a value of said at least one random number is lower than a first predetermined value;
    a processor coupled to said random number generator to deactivate said device for a predetermined number of access slots equal to a count of successive generations of said at least one random number while said value of said at least one random number is higher than or equal to said first predetermined value; and
    a timer module coupled to said processor to activate a timer interrupt to run subsequent to said predetermined number of access slots in preparation for transmission of an access probe to said communication network to enable said access to said network.

10. The apparatus according to claim 9, wherein said device is a mobile station and said network is a wireless communication network.

11. The apparatus according to claim 9, wherein said random number generator further comprises a counter to count said successive generations and wherein said predetermined number of access slots is equal to a counter value of said counter.

12. The apparatus according to claim 9, wherein said random number generator further generates a random access number for transmission of said access probe to said communication network.

13. The apparatus according to claim 11, wherein said random number generator further initializes said counter to a zero value and increments said counter by one subsequent to the generation of each of said at least one random number.

14. The apparatus according to claim 13, wherein, if said counter value of said counter reaches a second predetermined value, said processor further deactivates said device for a number of access slots equal to said second predetermined value.

15. The apparatus according to claim 9, wherein said timer module further disables said timer interrupt prior to transmission of said access probe.

16. The apparatus according to claim 9, wherein each of said at least one generated random number has a positive value lower than one.

17. An apparatus to perform a persistence test to enable a device to access a communication network, said apparatus comprising:
    means for generating successively at least one random number until a value of said at least one random number is lower than a first predetermined value;
    means for deactivating said device for a predetermined number of access slots equal to a count of successive generations of said at least one random number while said value of said at least one random number is higher than or equal to said first predetermined value; and
    means for activating a timer interrupt to run subsequent to said predetermined number of access slots in preparation for transmission of an access probe to said communication network to enable said access to said network.

18. The apparatus according to claim 17, wherein said device is a mobile station and said network is a wireless communication network.

19. The apparatus according to claim 17, wherein said predetermined number of access slots is equal to a counter value of a counter provided to count said successive generations.

20. The apparatus according to claim 17, further comprising means for generating a random access number for transmission of said access probe to said communication network.

21. The apparatus according to claim 19, further comprising:
    means for initializing said counter to a zero value for counting access slots; and
    means for incrementing said counter by one subsequent to the generation of each of said at least one random number.

22. The apparatus according to claim 21, further comprising, if said counter value of said counter reaches a second predetermined value, means for deactivating said device for a number of access slots equal to said second predetermined value.

23. The apparatus according to claim 17, further comprising means for disabling said timer interrupt prior to transmission of said access probe.

24. The apparatus according to claim 17, wherein each of said at least one generated random number has a positive value lower than one.

25. A computer readable medium containing executable instructions, which, when executed in a processing system, cause said processing system to perform a method to perform a persistence test to enable a device to access a communication network, said method comprising:
    generating successively at least one random number until a value of said at least one random number is lower than a first predetermined value;
    deactivating said device for a predetermined number of access slots equal to a count of successive generations of said at least one random number while said value of said at least one random number is higher than or equal to said first predetermined value; and
    activating a timer interrupt to run subsequent to said predetermined number of access slots in preparation for transmission of an access probe to said communication network to enable said access to said network.

26. The computer readable medium according to claim 25, wherein said device is a mobile station and said network is a wireless communication network.

27. The computer readable medium according to claim 25, wherein said predetermined number of access slots is equal to a counter value of a counter provided to count said successive generations.

28. The computer readable medium according to claim 25, wherein said method further comprises generating a random access number for transmission of said access probe to said communication network.

29. The computer readable medium according to claim 27, wherein said method further comprises:
    initializing said counter to a zero value for counting access slots; and
    incrementing said counter by one subsequent to the generation of each of said at least one random number.

30. The computer readable medium according to claim 29, wherein said method further comprises, if said counter value of said counter reaches a second predetermined value, deactivating said device for a number of access slots equal to said second predetermined value.

31. The computer readable medium according to claim 25, wherein said method further comprises disabling said timer interrupt prior to transmission of said access probe.

32. The computer readable medium according to claim 25, wherein each of said at least one generated random number has a positive value lower than one.

* * * * *